United States Patent
Tran et al.

(10) Patent No.: US 12,088,177 B2
(45) Date of Patent: Sep. 10, 2024

(54) DIRECT-DRIVE MOTOR DAMPER

(71) Applicant: VIETTEL GROUP, Ha Noi (VN)

(72) Inventors: Duy Nhat Tran, Vinh (VN); Quang Trung Trinh, Ha Noi (VN); Van Tien Pham, Hai Duong (VN); Tien Hai Tran, Ha Noi (VN); Do Trung Anh Pham, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 256 days.

(21) Appl. No.: 17/882,319

(22) Filed: Aug. 5, 2022

(65) Prior Publication Data
US 2023/0231439 A1     Jul. 20, 2023

(30) Foreign Application Priority Data
Jan. 19, 2022   (VN) ............................. 1-2022-00375

(51) Int. Cl.
    *H02K 5/24*        (2006.01)
    *H02K 7/08*        (2006.01)

(52) U.S. Cl.
    CPC ............... *H02K 5/24* (2013.01); *H02K 7/083* (2013.01)

(58) Field of Classification Search
    CPC .......... H02K 5/24; H02K 7/083; H02K 33/00; H02K 7/10
    See application file for complete search history.

(56) References Cited

U.S. PATENT DOCUMENTS

| 3,777,591 A | 12/1973 | Thomasian |
| 5,771,753 A | 6/1998 | Kwon et al. |
| 2008/0289416 A1* | 11/2008 | Thelen .................... F01D 5/027 73/471 |
| 2012/0060603 A1* | 3/2012 | Bork ....................... G01M 1/04 73/460 |
| 2017/0104428 A1* | 4/2017 | Himmelmann .......... H02K 1/22 |

FOREIGN PATENT DOCUMENTS

EP           0241556 B1     1/1992

\* cited by examiner

*Primary Examiner* — Thomas Truong
(74) *Attorney, Agent, or Firm* — patenttm.us

(57) ABSTRACT

The invention proposed damper protection for direct drive motor angle limits. This mechanism includes main components: Assembly guideway-spring, and Assembly angle limit bar, and Assembly direct-drive motor. The content mentioned in the invention describes the damping spring integrated inside the direct motor to protect the device when operating within the desired stroke limit. It can be applied to high-precision devices and motors. The invention's products can be applied in Direct-drive motor mechanisms that limit rotation angle with high-accuracy such as robotic arms, multi-sensor automatic observation devices, or unmanned equipment.

5 Claims, 3 Drawing Sheets

DIRECT-DRIVE MOTOR DAMPER

TECHNICAL FIELD

The invention relates to damper protection for direct-drive motor angle limits Specifically, the content mentioned in the invention describes the damping spring integrated inside the direct motor to protect the device when operating within the desired stroke limit. It can be applied to high-precision devices and motors.

BACKGROUND OF THE INVENTION

In the published patent documents, some works have content concerning damper protection for direct drive motor angle limits. However, Some shortcomings and limitations of the published inventions remain as follows:

U.S. Pat. No. 5,771,753A "Stopper for robot rotary articulation" issued Jun. 30, 1998 describes the design of stopper ring mechanism for robot. The content of the invention mainly covers angle limit. However, the design doesn't have a damping mechanism for the motor in the content of the invention.

U.S. Pat. No. 3,777,591A "Rotation limiting device" publisissuedhed Dec. 11, 1973 describes the design of an angle limit structure with a damper mechanism. The content of the invention mainly covers details of the damper and angle limit mechanism. This design isn't space-saving, drive-through actuators lead to large angle control tolerance.

European Published Patent Application No. 0241556B1 "Apparatus for limiting the operation range of an industrial robot" published Jan. 8, 1992 describes the design of a limiting, angle mechanism of the robot. The content of the invention mainly covers details of outside stopped integrated to robot. The design isn't flexible, and it is hard to use for small-sized devices.

To overcome the above limitations, the inventors propose a damper protection for direct-drive motor angle limits, unlike any other patents ever published.

BRIEF SUMMARY OF THE INVENTION

The purpose of the present invention is to describe in detail the design of damper protection for direct drive motor angle limits. The mechanism uses springs integrated inside the rotor of the direct-drive motor and guideways to ensure the system rotates within the specified angle limit. When the motor rotates and passes the angle limit value, the spring mechanism brakes the device's acceleration and inertia, protecting it in the case of an operating device at overload, as well as the high-acceleration environment. In addition, the structure is designed to be compact, easy to integrate into the motor, space optimization to minimize load for the purpose of precise control of the device.

To achieve the above purpose, the authors propose to design a damper protection for direct drive motor angle limits comprising assembly parts shown in FIG. 1: Assembly guideway-spring, Assembly angle limit bar and Assembly direct-drive motor. The detailed parts in each assembly of a damper protection for direct drive motor angle limits are detailed in FIG. 2:

The assembly guideway-spring comprises Rail, Slider, Connecting slider table, Fixing spring part, Spring, Connecting axis pedestal.

The assembly angle limit bar comprises Shaft-angle limit bar connecting part, Angle limit bar.

The assembly direct-drive motor comprises Stator, Rotor, Rotary shaft, Mounting stator, Mounting motor shaft, Motor shaft, Bearing, Inner spacing part, Outer spacing part, Connecting mount, Fixing bearing part, Fixing rotor part.

The invention's products can be applied in Direct-drive motor mechanisms that limit rotation angle with high-accuracy such as robotic arms, multi-sensor automatic observation devices, or unmanned equipment.

DETAILED DESCRIPTION OF THE INVENTION

Figure 1:
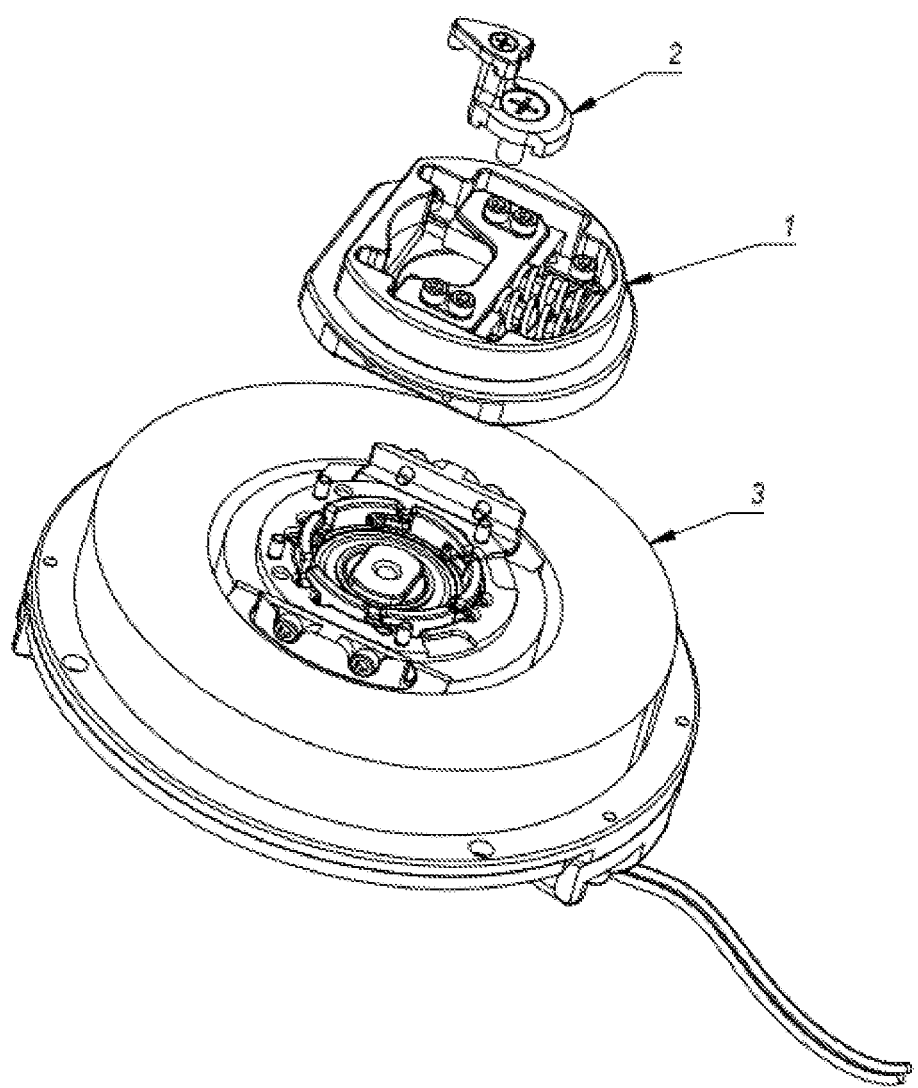
FIG. 1 Overview of the damper protection for direct-drive motor angle limits.
Figure 2:
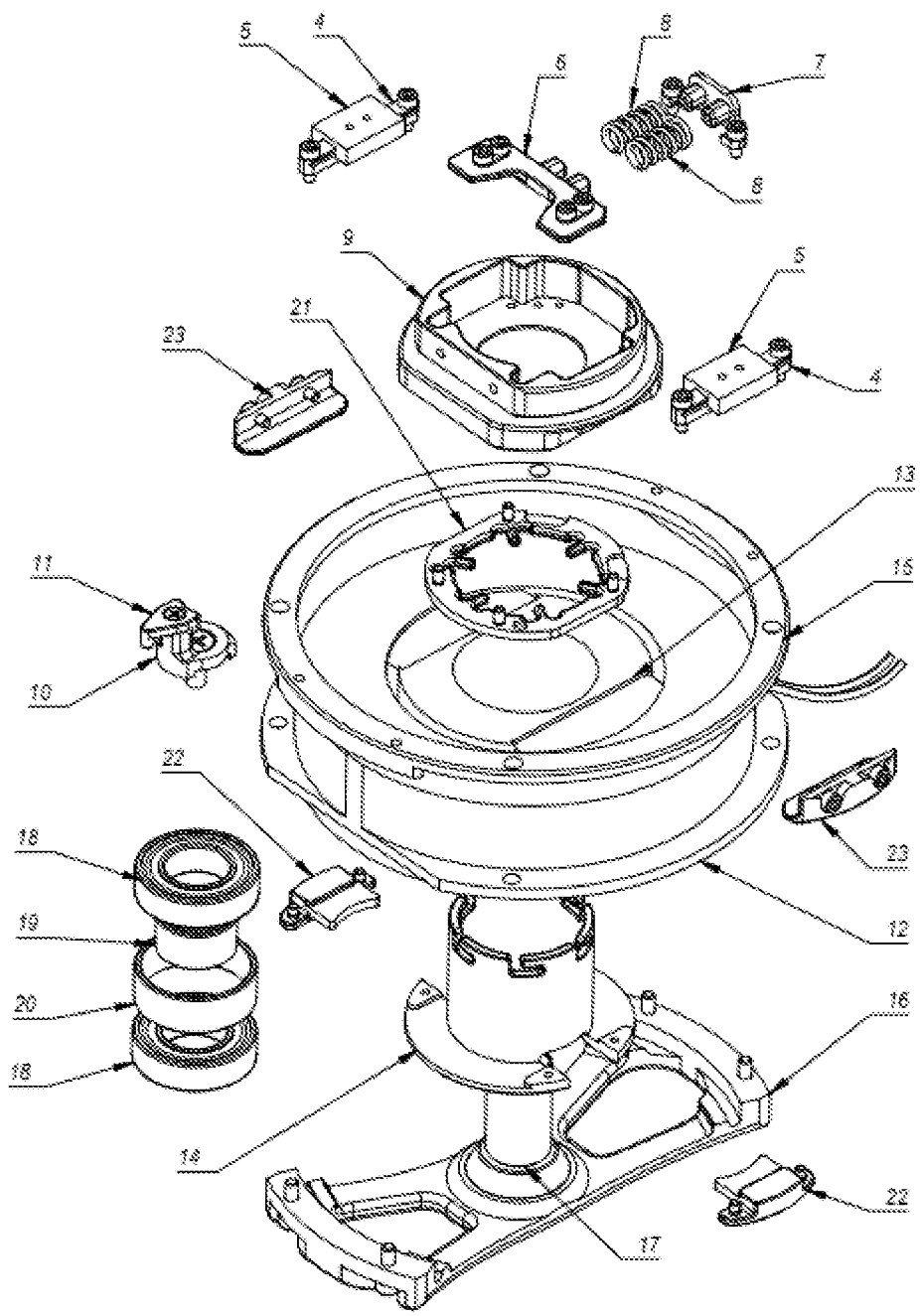
FIG. 2 Detailed of the damper protection for direct-drive motor angle limits.
Figure 3:
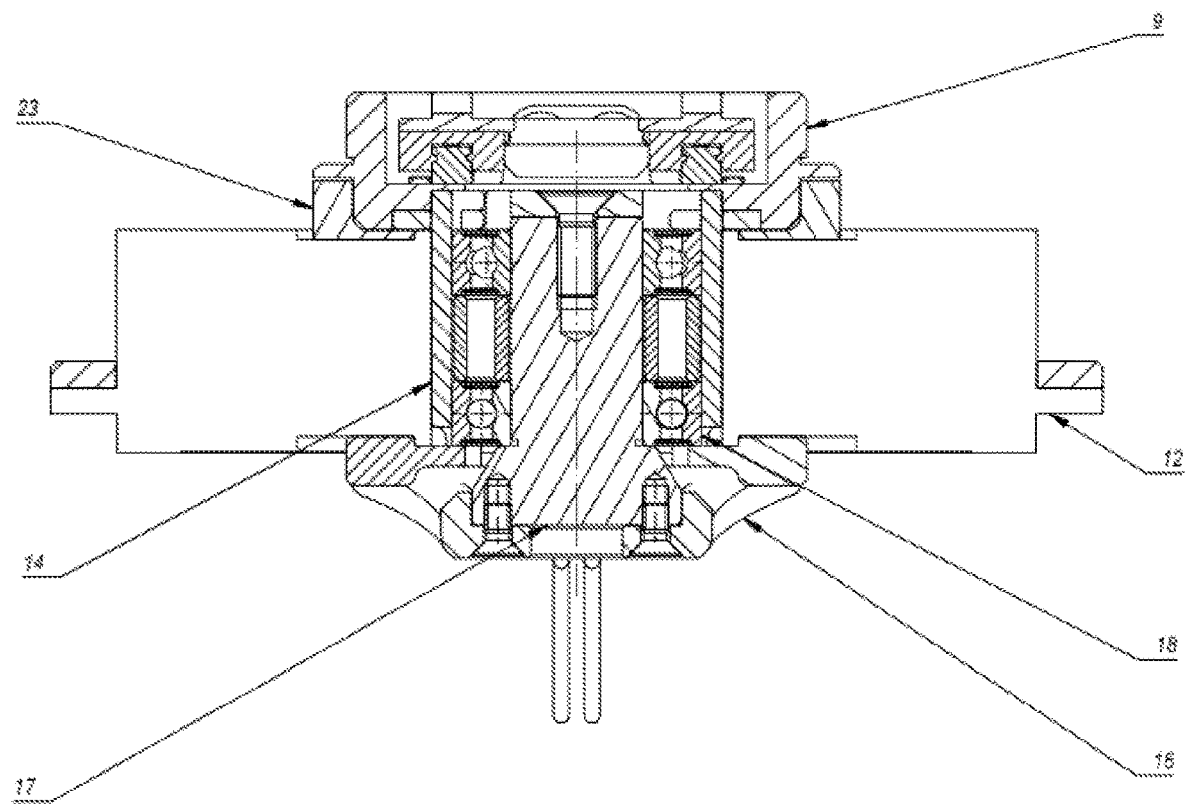
FIG. 3 Section view of the structure.
Figure 4:
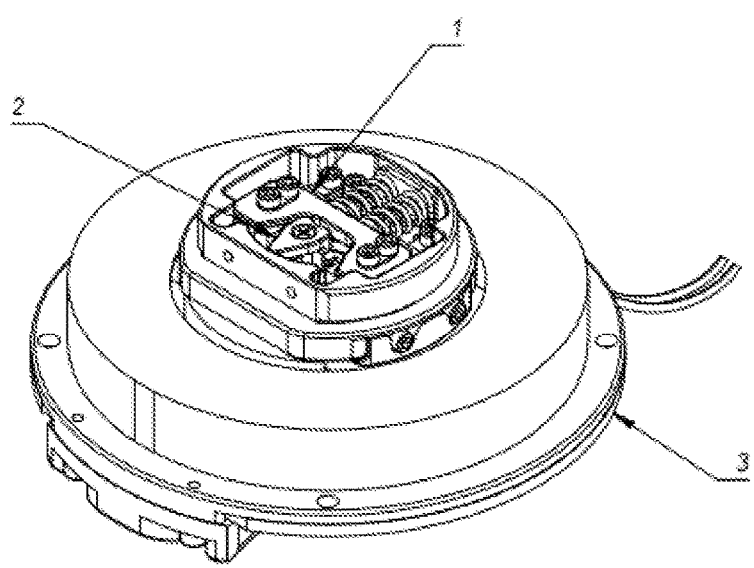
FIG. 4 Industrial design of the damper protection for direct-drive motor angle limits.

Refer to FIG. 1, FIG. 2 and FIG. 3, The main equipment assemblies of the damper protection for direct-drive motor angle limits are included:

Assembly guideway-spring (1): comprises a mechanical part with the function of converting the rotating angle motion to the translational motion in the direction of the spring to perform the damping phase after the critical angular collision. The mechanism uses two guideways to minimize the friction caused by the mechanism. The travel of the guideway is mechanically limited to the damper rotation required by the device (within 15° on each side).

Assembly guideway-spring (1) comprises Rail (4), Slider (5), Connecting slider table (6), Fixing spring part (7), Spring (8), Connecting axis pedestal (9); the differences are:

Rail (4): is a mechanical part made of steel alloy used to determine direction of translation motion, fixed to the connecting axis pedestal (9) by screw by a bolt joint;

Slider (5): is a standard mechanical part used to reduce friction in the translation motion of device attached to slider on the rail (4);

Connecting slider table (6): is a mechanical part used to connect two slider (5) and keep the direction of movement of one end of the spring (8);

Fixing spring part (7): is a mechanical part used to fix the other end of the spring (8);

Spring (8): is a standard mechanical part that is selected according to following parameters: length, maximum allowable deflection, maximum load, inner diameter, outer diameter for damping to suppress the kinetic energy of the device in the braking zone;

Connecting axis pedestal (9): is a mechanical part used to cover and mount the parts in Assembly guideway-spring (1). It is the output shaft of the device.

According to the implementation of the invention, at Assembly guideway-spring (1), mechanical parts are arranged in the space inside the diameter of the motor rotor, the system of two rails (4) and two sliders (5) are placed symmetrically to arrange two springs (8) in the middle. The connecting axis pedestal (9) has a mechanical bezel that limits the stroke of slider (5). The value of the reciprocating stroke is converted from the device's overload sweep angle stroke (within 15° on each side). From the value of the shock absorber stroke and the inertia force of the device at impact, determine the spring (8) suitable for the parameters (length, maximum allowable deflection, maximum load, inner diameter, outer diameter).

Assembly angle limit bar (2) consists of Shaft-angle limit bar connecting part (10), Angle limit bar (11). At each substructure of the Assembly angle limit bar (2), the differences are:

Shaft-angle limit bar connecting part (10): is mechanical part used to connect Rotary shaft and angle limit bar (11);

Angle limit bar (11): is the collision point of the structure when the angular limit is reached.

According to the implementation of the invention, at Assembly angle limit bar (2), angle limit bar (11) fixed to the Motor shaft by a bolt joint through shaft-angle limit bar connecting part (10). When the motor is operating in the limited angle area, the damper protection mechanism doesn't affect the motor to ensure the accuracy of the proposed control. When the motor is operating beyond the limit angle value, angle limit bar (11) collision with assembly guideway-spring (1) at slider (5) on the right side forward to the direction of the motor or to the left in the opposite direction. The damping phase occurs, the compressed spring (8) absorbs the inertia load of the motor generated when overloading. The motor continues to rotate at a permissible damping angle (about 15°), the system of two springs (8) creates a reaction force to balance the inertia force. In the case the inertia force is too large, the system has a stiff locking joint. Through the spring system, the inertia force has been largely reduced, avoiding damage to the device.

Assembly direct-drive motor (3) including mechanical parts, the motor has the function of ensuring the relative position between the stator and the rotor; cover and protect the engine. Specifically, it comprises Stator (12), Rotor (13), Rotary shaft (14), Mounting stator (15), Mounting motor shaft (16), Motor shaft (17), Bearing (18), Inner spacing part (19), Outer spacing part (20), Connecting mount (21), Fixing bearing part (22), Fixing rotor (23):

Stator (12): is the stationary part of a direct-drive frameless motor fixed to mounting stator (15) and mounting motor shaft (16);

Rotor (13): is the rotating part of a direct-drive frameless motor;

Rotary shaft (14): is a precision rotating mechanical part used to transmit the shaft rotation motion from the rotor (13) and stator (12) of the frameless;

Mounting stator (15): is a rotating mechanical part used to fix stator (12);

Mounting motor shaft (16): is a precision mechanical part used to fix motor shaft (17) to stator (12);

Motor shaft (17): is a rotating mechanical part used to create a fixed shaft for the motor;

Bearing (18): is the standard mechanical part used to reduce the friction between the motor shaft (17) and the rotary shaft (14);

Inner spacing part (19): is a rotating mechanical part used to determine the distance of the inner ring of bearing (18);

Outer spacing part (20): is a rotating mechanical part used to determine the distance of the outer ring of bearing (18);

Connecting mount (21): is a mechanical part used to connect rotary shaft (14) with assembly guideway-spring (1);

Fixing bearing part (22): is a mechanical part used to tighten the outer ring of bearing (18);

Fixing rotor (23): is a mechanical part used to fix rotor (13) to rotary shaft (14).

According to the implementation of the invention, in Assembly direct-drive motor (3), the mechanism uses a motor that separates the rotor (13) and stator (12); the rotor (13) is hollow-shaped, allowing enough space to arrange a fixed shaft inside the motor.

Assembly guideway-spring (1) and assembly direct-drive motor (3) are connected together through connecting mount (21) and connecting axis pedestal (9) by a shaft joint and tightened by bolts. Assembly angle limit bar (2) is connected to an assembly direct-drive motor (3) through shaft-angle limit bar connecting part (10) and motor shaft (17) by a shaft joint.

During damping, three cases occur: the motor reverses the direction of rotation relative to inertia, the motor stops, and the motor rotates in the direction of rotation of inertia. In the case of a reverse rotation motor, the rotational kinetic energy of the system is partially converted to the compressive potential of spring (8) and partly dissipated by the braking torque component due to the action of friction and the motor. In the remaining two cases, there is no longer a braking torque on the driving motor; especially in the worst case, the motor rotates in the direction of rotation of inertia. The compression potential is the maximum and the spring stiffness value of spring (8) must ensure that the kinetic energy of the system is completely eliminated. The stiffness value of spring (8) is selected depending on the rotational limit of the allowable braking angle. If the allowable braking angle value is large, spring (8) with lower stiffness is selected, if the braking angle value is small, spring (8) is selected with higher stiffness. The standard diameter and length dimensions of spring (8) are selected in accordance with the allowed space on the mechanism of assembly guideway-spring (1).

The arrangement of mechanical components is shown through the cross-section of the mechanism in FIG. 3. The damping mechanism fits into the output shaft of the motor, saving space and weight and making it easy to integrate the engine into devices with different uses. Damper protection inside the engine helps to protect the impact, vibration from outside affecting the durability of the engine as well as improving the quality of control in areas near the angle limit.

In addition, the mechanical parts are made of anodized aluminum alloy to make sure the structure is hardened, optimize the weight, as well as isolate the electronic circuit blocks. The types of aluminum alloys that can be used are 6061-T6, 2017. That alloys have similar physical and thermal properties, choosing production suitable materials of mechanical parts depends on the aluminum workpiece available on the market.

The invention claimed is:

1. Damper protection for direct drive motor angle limits comprises an Assembly guideway-spring, an Assembly angle limit bar, and an Assembly direct-drive motor:

The Assembly guideway-spring includes:
A pair of Rails that are mechanical parts made of steel alloy used to determine direction of translation motion, fixed to a connecting axis pedestal by a screw by a bolt joint;
A pair of Sliders riding on a respective rail used to reduce friction in the translation motion of the sliders on the rails;
A Connecting slider table used to connect the pair of\ sliders and keep the a direction of movement of one end of the Assembly guideway spring;

A pair of springs engaging the connecting slider table at first ends of the springs, wherein the springs selected according to following parameters: length, maximum allowable deflection, maximum load, inner diameter, outer diameter for damping to suppress kinetic energy in a braking zone;

A Fixing spring for fixing second ends of the springs;

The Connecting axis pedestal is used to cover and mount the parts in Assembly guideway-spring and comprises an output shaft of the Assembly guideway-spring;

The Assembly angle limit bar comprises:

A Shaft-angle limit bar connecting part is mechanical part used to connect a Rotary shaft and an angle limit bar;

The Angle limit bar is a collision point of the structure when an angular limit is reached;

The Assembly direct-drive motor comprises:

A Stator comprising a stationary part of the Assembly direct-drive motor fixed to a mounting stator and a mounting motor shaft;

A Rotor comprising rotating part of the Assembly direct-drive motor;

The Rotary shaft to transmit the shaft rotation motion from the rotor and stator of the Assembly direct-drive motor;

A Mounting stator to fix the stator;

A Mounting motor shaft to fix a motor shaft to the stator;

The Motor shaft is a rotating mechanical part used to create a fixed shaft for the Assembly direct drive motor;

A Bearing to reduce the friction between the motor shaft and the rotary shaft;

An Inner spacing part comprising a rotating mechanical part used to determine the distance of the an inner ring of bearing;

An Outer spacing part comprising a rotating mechanical part used to determine the distance of an outer ring of bearing;

A Connecting mount to connect the rotary shaft with the assembly guideway-spring;

A Fixing bearing to tighten the outer ring of bearing; and

A Fixing rotor is a mechanical to fix rotor to rotary shaft.

2. The Damper protection for direct drive motor angle limits according to claim 1 wherein the assembly guideway-spring components are arranged in a space inside the diameter of the rotor, the two rails and two sliders are placed symmetrically to arrange the two spring in the middle thereof; The connecting axis pedestal has a mechanical bezel that limits a stroke of sliders.

3. The Damper protection for direct drive motor angle limits according to claim 1 wherein the assembly angle limit bar, angle limit bar is fixed to the Motor shaft by a bolt joint through a shaft-angle limit bar connecting part.

4. The Damper protection for direct drive motor angle limits according to claim 1 wherein the assembly direct-drive motor, comprises a motor that separates the rotor and stator; wherein the rotor is hollow-shaped, allowing space to arrange a fixed shaft inside the motor.

5. The Damper protection for direct drive motor angle limits according to claim 1, wherein Assembly guideway-spring and assembly direct-drive motor are connected together through a connecting mount and a connecting axis pedestal by a shaft joint and tightened by bolts; the Assembly angle limit bar is connected to an assembly direct-drive motor through a shaft-angle limit bar connecting part and to the motor shaft by a shaft joint.

\* \* \* \* \*